United States Patent
Vangala et al.

(10) Patent No.: US 12,493,535 B2
(45) Date of Patent: Dec. 9, 2025

(54) DATA REPLICATION ACROSS DATA SERVERS FOR FAILOVER PROCESSING

(71) Applicant: Bank of America Corporation, Charlotte, NC (US)

(72) Inventors: Gayathri Vangala, Frisco, TX (US); Kalpana Kumaraswami, Belle Mead, NJ (US); Gaurav Jain, Belle Mead, NJ (US)

(73) Assignee: Bank of America Corporation, Charlotte, NC (US)

( * ) Notice: Subject to any disclaimer, the term of this patent is extended or adjusted under 35 U.S.C. 154(b) by 118 days.

(21) Appl. No.: 18/324,264

(22) Filed: May 26, 2023

(65) Prior Publication Data

US 2024/0394157 A1 Nov. 28, 2024

(51) Int. Cl.
*G06F 11/20* (2006.01)
*G06F 16/25* (2019.01)

(52) U.S. Cl.
CPC ........ *G06F 11/2028* (2013.01); *G06F 16/254* (2019.01); *G06F 11/203* (2013.01); *G06F 11/2074* (2013.01)

(58) Field of Classification Search
CPC .............. G06F 11/2028; G06F 11/203; G06F 11/2074; G06F 16/254
See application file for complete search history.

(56) References Cited

U.S. PATENT DOCUMENTS

| | | | |
|---|---|---|---|
| 9,079,562 B2 * | 7/2015 | Bert | G06F 11/2033 |
| 10,044,551 B2 * | 8/2018 | Astigarraga | G06F 11/3055 |
| 10,048,996 B1 | 8/2018 | Bell et al. | |
| 10,116,732 B1 | 10/2018 | Canton et al. | |
| 10,127,086 B2 | 11/2018 | Ghare | |
| 10,254,720 B2 | 4/2019 | Slessman et al. | |
| 10,270,668 B1 | 4/2019 | Thompson et al. | |
| 10,379,838 B1 | 8/2019 | Chud | |
| 10,445,197 B1 | 10/2019 | Harpreet | |
| 10,560,465 B2 | 2/2020 | Ghare et al. | |
| 10,725,763 B1 | 7/2020 | Chud | |
| 10,841,241 B2 | 11/2020 | Wise et al. | |
| 10,860,441 B2 | 12/2020 | Dai et al. | |
| 11,126,506 B2 | 9/2021 | Martynov et al. | |

(Continued)

OTHER PUBLICATIONS

Wikipedia's Extract, Transform, Load historical version published May 17, 2023 https://en.wikipedia.org/w/index.php?title=Extract,transform,_load&oldid=1155224640 (Year: 2023).*

(Continued)

*Primary Examiner* — Joseph O Schell

(57) ABSTRACT

A system comprises a first data center, a second data center and a cloud server. A first server of the first data center receives a command to process a first processing job, accesses from the cloud server a software application, and processes the first processing job using the software application. The first server transmits the processing data associated with the processing to a second data center. A second server of the second data center receives and stores the processing data in a memory associated with the second data center. The second server detects that the processing of the first processing job was interrupted at the first server and, in response, resumes the processing based on the processing data.

20 Claims, 3 Drawing Sheets

(56) References Cited

U.S. PATENT DOCUMENTS

| | | |
|---|---|---|
| 11,128,560 B2 | 9/2021 | Joshi et al. |
| 11,146,497 B2 | 10/2021 | Larsson et al. |
| 11,165,667 B2 | 11/2021 | Dippenaar et al. |
| 11,240,117 B2 | 2/2022 | Moghe et al. |
| 11,245,622 B2 | 2/2022 | Joshi et al. |
| 2002/0042818 A1* | 4/2002 | Helmer .................. H04L 69/40 709/217 |
| 2003/0041093 A1* | 2/2003 | Yamane ................ H04L 67/564 709/224 |
| 2005/0015657 A1* | 1/2005 | Sugiura ............... G06F 11/1482 714/E11.008 |
| 2008/0162845 A1* | 7/2008 | Cox .................... G06F 11/2069 711/E12.103 |
| 2008/0228834 A1* | 9/2008 | Burchall ............. G06F 11/2038 |
| 2009/0276590 A1* | 11/2009 | Nagaraj ............. G06F 11/1464 711/E12.001 |
| 2012/0060167 A1 | 3/2012 | Salsburg et al. |
| 2016/0162369 A1* | 6/2016 | Ahn .................... G06F 11/1461 707/654 |
| 2018/0165693 A1 | 6/2018 | Jain et al. |
| 2021/0160318 A1* | 5/2021 | Sajeepa ............... H03M 13/154 |

OTHER PUBLICATIONS

Wikipedia's Infrastructure as a Service historical version published May 4, 2023 https://en.wikipedia.org/w/index.php?title=Infrastructure_as_a_service&oldid=1153223908 (Year: 2023).*

Wikipedia's Firewall (Computing) historical version published Apr. 22, 2023 https://en.wikipedia.org/w/index.php?title=Firewall_(computing)&oldid=1151250885 (Year: 2023).*

* cited by examiner

DATA REPLICATION ACROSS DATA SERVERS FOR FAILOVER PROCESSING

TECHNICAL FIELD

The present disclosure relates generally to network communications, and more specifically to data replication across data servers for failover processing.

BACKGROUND

Avoiding downtime associated with a data center is generally a top priority for data center administrators, especially when a data center is associated with critical systems and services such as banking services, flight services, weather services, cellular phone services, emergency services etc. However, a data center may fail because of several reasons including, but not limited to, network failures, hardware and software malfunctions, power outages, cyber-attacks and human errors. A data center outage may cause significant harm to an organization including lost revenues, reduced productivity, loss of reputation, and lost data. When a data center is associated with a critical system or service, data center downtime may cause disruption in critical services and even hard to and/or loss of life.

SUMMARY

The system and method implemented by the system as disclosed in the present disclosure provide technical solutions to the technical problems discussed above by providing failover mechanisms in the event a data center fails and is rendered out of service.

For example, the disclosed system and methods provide the practical application of recovering from a failure of a data center or a portion thereof with no or little interruption in service. Embodiments of the present disclosure describe techniques to implement data replication across data centers and across data servers within a particular data center so that processing of a job may be seamlessly transferred between data centers and/or data servers in the event of a data center and/or data server failure. For example, a first data center receives a command to process/execute a processing job using a software application stored in a cloud service. In response, a first server of the first data center accesses the software application from a cloud server of the cloud service and initiates processing the requested processing job based on the software application. The first server transmits processing data associated with the processing of the processing job to a second data center in real-time, for example, as the processing data is being generated and stored in a shared memory of the first data center. A second server of the second data center receives the processing data from the first server and stores the received processing data in a shared memory of the second data center. In response to detecting that the first data center was rendered out of service before completing processing of the processing job, the second server of the second data center automatically takes over processing of the processing job from the first data server. For example, the second server accesses the processing data stored in the shared memory of the second data center and resumes processing of the processing job based on the processing data. It may be noted that the second server is able to resume processing of the processing job at or near a stage where the processing was interrupted at the first server, because the processing data associated with the processing at the first server is transmitted and stored in the shared memory of the second data center in real-time. This means that shared memory of the second data center reflects the most recent processing data which allows the second server to resume processing the processing job without interruption in service. This avoids and, in some cases, eliminates any downtime associated with the first data center going out of service.

Further, by avoiding or eliminating interruption in processing jobs that may otherwise occur because of a data center failure, the disclosed system and method improve the efficiency and processing of computing systems (e.g., data servers) used to implement the data centers in a computing infrastructure.

Thus, the disclosed system and method generally improve the technology associated with processing data in a computing infrastructure.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
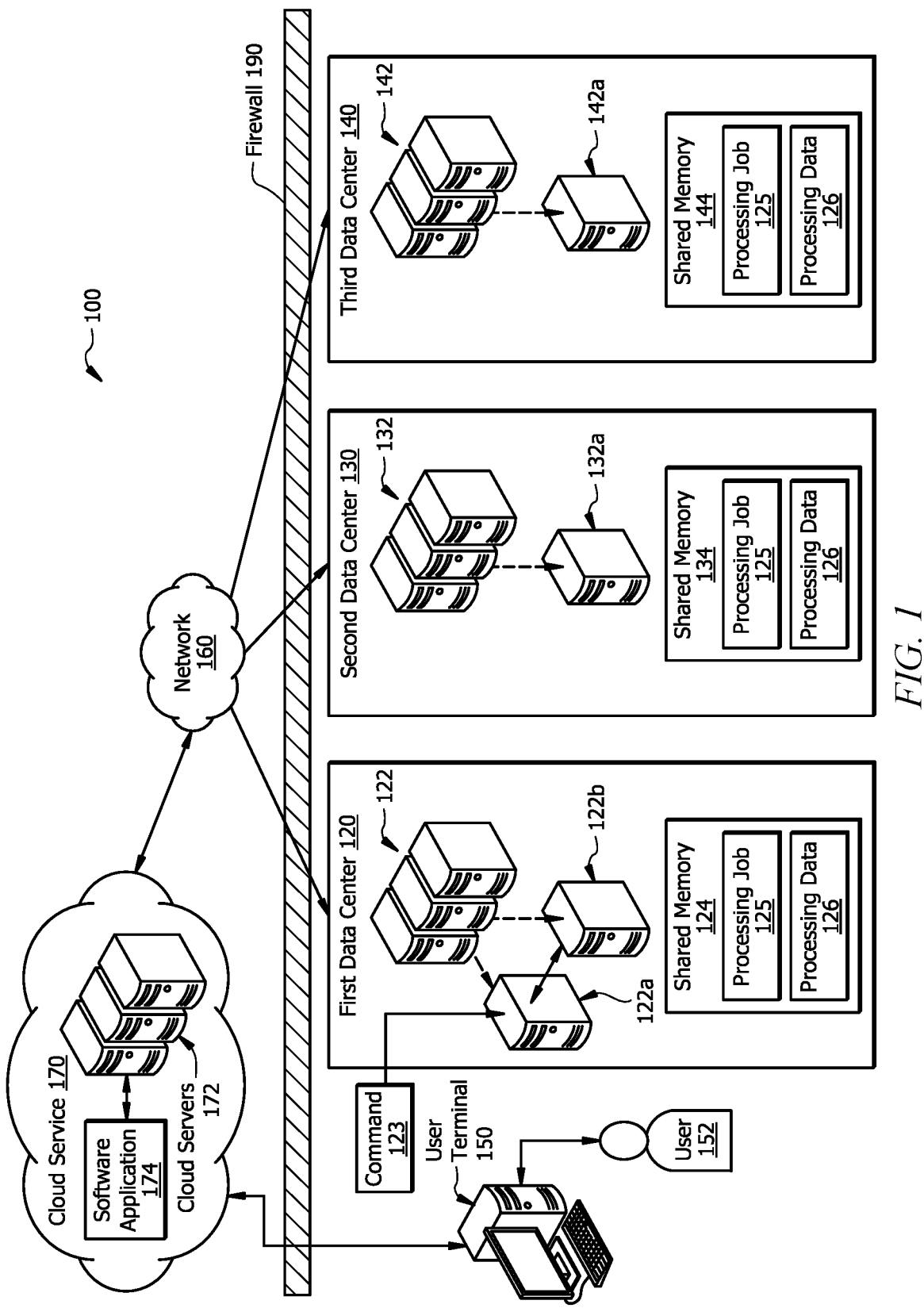
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 110 and a cloud service 170 connected to a network 160. Computing infrastructure 110 may include a plurality of hardware and software components. The hardware components may include, but are not limited to, computing nodes such as desktop computers, smartphones, tablet computers, laptop computers, servers and data centers, virtual reality (VR) headsets, augmented reality (AR) glasses and other hardware devices such as printers, routers, hubs, switches, and memory devices all connected to the network 160. Software components may include software applications that are run by one or more of the computing nodes in the computing infrastructure 110 including, but not limited to, operating systems, user interface applications, third party software, database management software, service management software, metaverse software and other customized software programs implementing particular functionalities. For example, software code relating to one or more software applications may be stored in a memory device and one or more processors may process the software code to implement respective functionalities. In one embodiment, at least a portion of the computing infrastructure 110 may be representative of an Information Technology (IT) infrastructure of an organization.

As shown in FIG. 1, computing infrastructure 110 includes a plurality of data centers 120, 130 and 140 connected to network 160. While FIG. 1 shown three data centers, it may be noted that computing infrastructure may include less than three or more than three data centers. The term "data center" generally refers to a facility that centralizes an organization's IT operations and equipment for the purposes of storing, processing and disseminating data and applications. Because they house an organization's most critical and proprietary assets, data centers are vital to the continuity of daily operations. A data center provides several services including, but not limited to, data storage, data management, data recovery, productivity applications such as emails, high volume e-commerce transactions, big data, machine learning and artificial intelligence. In one embodiment, each of the data centers 120, 130 and 140 may be an enterprise data center that is constructed, owned and utilized by an organization/entity for its own internal computing needs. An enterprise data centers are custom-built to meet the requirements of the organization/entity who owns them and are housed on-premises. In an alternative or additional embodiment, one or more of the data centers 120, 130 and 140 may be a cloud data center hosted in a cloud service (e.g., cloud service 170) and managed by a third-party service provider allowed users of the organization/entity who owns the data center to access resources of the data center via the internet. Core elements of a data center include, but are not limited to, storage systems, servers, and other network infrastructure such as switches and routers. For example, as shown in FIG. 1, each of the data centers 120, 130 and 140 includes one or more servers 122, 132 and 142 respectively. Each data center 120, 130 and 140 further includes a shared memory 124, 134 and 144 respectively. Computing infrastructure 110 may further include one or more user terminals 150 that may be used by a user 152 to manage the data centers 120, 130 and 140 and access the cloud service 170.

As shown in FIG. 1, cloud service 170 may be accessible by the user terminal 150 and each of the data centers 120, 130 and 140 of the computing infrastructure 110 via network 160. The term "cloud services" generally refers to a wide range of services delivered on demand to companies and users over the internet. These services are designed to provide easy, affordable access to software applications and other resources. Cloud services such as cloud service 170 are generally managed by cloud service providers.

The cloud service 170 may include a set of one or more hardware resources and software resources. In this context a hardware resource may include but is not limited to, a processor, a memory device, a server, a database, or any other hardware device, machine or component. For example, cloud service 170 includes a plurality of cloud servers 172. A software resource may include, but is not limited to, a software program or application such as an operating system, user interface or other customized software that can implement one or more functionalities at the data centers 120, 130 and 140. In one embodiment, cloud service 170 may provide pre-configured cloud instances (not shown), wherein each cloud instance of the cloud service includes a unique set of hardware and/or software resources. In cloud computing, a cloud instance generally refers to a virtual machine that uses one or more hardware and/or software resources of a cloud infrastructure to run a workload/job. The term "workload" or "job" generally refers to an application or service deployed using a computing machine (e.g., virtual machine) that consumes resources such as computing power and memory. In addition to the pre-configured cloud instances, the cloud service 170 may allow customized cloud instances to be created to cater to customized needs.

One or more computing nodes (e.g., servers 122, 132, 142 and user terminal 150) of the computing infrastructure 110 and the cloud servers 172 may be representative of a computing system hosting software applications that may be installed and run locally or may be used to access software applications running on a server (e.g., a centralized server). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes of the computing infrastructure and/or the cloud servers may be representative of a server running one or more software applications to implement respective functionality as described below. In certain embodiments, one or more of the computing nodes may run a thin client software application where the processing is directed by the thin client but largely performed by a central entity such as a server.

Network 160, in general, may be a wide area network (WAN), a personal area network (PAN), a cellular network, or any other technology that allows devices to communicate electronically with other devices. In one or more embodiments, network 160 may be the Internet.

In certain embodiments, cloud service 170 may be based on a Software as a Service (SaaS) cloud service model, Platform as a Service (PaaS) cloud service model or a combination thereof. SaaS is the most widely recognized type of cloud service model and generally encompasses a variety of services such as file storage and backup, web-based email, project management tools etc. The SaaS model generally stores several software applications (e.g., software applications 174) in the cloud (e.g., cloud servers 172), wherein each software application 174 provides a particular service/functionality to subscribers of the particular cloud service 170. The PaaS cloud service model serves as a web-based environment where software developers can build cloud applications (e.g., software applications 174). Typically, the PaaS model provides a database, operating system and programming language that software developers of a particular organization can use to develop customized cloud-based software applications 174 to implement particular functionalities in an enterprise infrastructure (e.g., computing infrastructure 110). For example, a user 152 of an organization that owns and/or operates the computing infrastructure 110 may use a web-browser on user terminal 150 to access a cloud server 172 of the cloud service 170 over the network 160 and develop customized software applications 174 that can be used to process jobs/workloads (e.g., processing jobs 125) in one or more data centers 120, 130, 140. Once developed, the software applications 174 may be stored on one or more cloud servers 172. The software applications may be accessed on the cloud servers 172 and run by a data server (e.g., 122) of a data center (e.g., data center 120) to process jobs (e.g., processing job 125). For example, a software developer (e.g., user 152) may use the user terminal 150 to develop an Extract, Transform and Load (ETL) application on a cloud server 172. The ETL application may be stored in on a cloud server 172. When an ETL processing job is ready to be processed, a user 152 may command a data server 122a to process the ETL job using the ETL application 174 stored in the cloud service 170. The ETL processing job may include extracting source data from one or more source systems (not shown), transform the source data using the ETL application and store the transformed data into one or more target databases (e.g., a data warehouse). The data server 122 may access the ETL application from the cloud service 170 may process the ETL job using the ETL application. It may be noted that the terms "software application 174" and "cloud application 174" are used interchangeably throughout this disclosure.

The PaaS model allows software developers to develop, update and maintain customized software applications using the latest technology platforms made available by the cloud service 170. Further, since data is processed on an organization's computing infrastructure 110, the data never leaves the computing infrastructure 110 which allows for high data security. As shown in FIG. 1, the computing infrastructure 110 of an organization includes a firewall 190. All data residing on the organization's computing infrastructure including data that resides in the data centers 120, 130 and 140 is protected by the firewall 190. When processing a job/workload (e.g., processing job 125) using a cloud application 174, data never gets staged or run through the cloud servers 172 and thus remains secure behind the organization's firewall 190.

Avoiding downtime associated with a data center (e.g., data center 120) is generally a top priority for data center administrators, especially when a data center is associated with critical systems and services such as banking services, flight services, weather services, cellular phone services, emergency services etc. However, a data center may fail because of several reasons including, but not limited to, network failures, hardware and software malfunctions, power outages, cyber-attacks and human errors. A data center outage may cause significant harm to an organization including lost revenues, reduced productivity, loss of reputation, and lost data. When a data center is associated with a critical system or service, data center downtime may cause disruption in critical services and even loss of life.

Embodiments of the present disclosure describe techniques to recover from a failure of a data center or a portion thereof. As further described in embodiments of the present disclosure, techniques are described to implement data replication across data centers and across data servers within a particular data center so that processing of a job may be seamlessly transferred between data centers and/or data servers in the event of a data center and/or data server failure. While certain embodiments of the present disclosure are described with reference to particular servers and particular data centers shown in FIG. 1, a person having ordinary skill in the art may appreciate that these embodiments apply to all data servers and data centers shown in FIG. 1, and also to any data center or data server that is part of a computing infrastructure owned and/or managed by an organization/entity.

As shown in FIG. 1, first data center 120 includes a first cluster of servers 122, second data center 130 includes a second cluster of servers 132, and third data center 140 includes a third cluster of servers 142. Additionally, each of the data centers 120, 130 and 140 includes a shared memory 124. As shown in FIG. 1, first data center 120 includes shared memory 124, data center 130 includes shared memory 134, and data center 140 includes shared memory 144. Each of the shared memory 124, 134 and 144 may be a central memory device or a distributed memory, that is accessible to a plurality of servers 122, 132 and 142 of the respective data center 120, 130 and 140. For example, shared memory 124 is accessible to a plurality of servers 122 of the data center 120, wherein processing data associated with processing conducted by each of the plurality of servers 122 may be stored in the shared memory 124. Similarly, shared memory 134 is accessible to a plurality of servers 132 of the data center 130, wherein processing data associated with processing conducted by each of the plurality of servers 132 may be stored in the shared memory 134. Also, shared memory 144 is accessible to a plurality of servers 142 of the data center 140, wherein processing data associated with processing conducted by each of the plurality of servers 142 may be stored in the shared memory 144.

The first data center 120 may be configured to receive a command 123 to process/execute a processing job 125 using a particular software application 174 stored in the cloud service 170 (e.g., stored on a cloud server 172). The processing job 125 may include extracting source data from one or more source systems/databases (not shown), transform the source data using the software application 174 (e.g., an ETL application), and store the transformed data into one or more target systems/databases (e.g., a data warehouse). It may be noted that the source systems/databases and the target systems/databases may be part of and/or stored in one or more servers 122, 132, 142 associated with respective one or more data centers 120, 130 and 140. In response to receiving the command 123, a first server 122a of the first data center 120 may access the software application 174 associated with processing the processing job 125 from the cloud service 170 and may process the requested processing job 125 by running the software application 174.

As described above, a data center 120 or a portion thereof (e.g., one or more servers 122) may fail because of several reasons. Servers 122 of the first data center 120 may be configured to implement a failure recovery mechanism to handle situations where the first data center 120 or a portion thereof fails and goes out of service. For example, first server 122a may be configured to store processing data 126 associated with processing of the processing job 125 in the shared memory 124 in real-time as the processing is conducted by the first server 122a. Processing data 126 may include, but is not limited to, data indicative of a stage of the processing being conducted by the first server 122a, a stage and/or stages of processing that have been completed by the first server 122a, and any other data and/or metadata generated when processing previous stages of the processing job 125 and needed for processing subsequent stages of the processing job 125. In one example, processing data 126 associated with processing of processing job 125 includes a processing log that records data and metadata associated with the processing.

First server 122a may be configured to transmit the processing data 126 to the second data center 130 in real-time, for example, as the processing data 126 is being generated and stored in the shared memory 124 of the first data center 120. For example, as the processing job 125 is processed by the first server 122a and as the processing data 126 is generated, first server 122a may be configured to store the processing data into the shared memory 124 and transmit to the second data center 130 simultaneously. A server 132a in the second data center 130 may be configured to receive the processing data 126 from the first server 122a and store in the shared memory 134 associated with the second data center 130 such that, at any time, shared memory 134 mirrors or closely mirrors the shared memory 124 associated with the first data center 120 with regard to the processing data 126. In other words, at any time during the processing of the processing job 125 processing data 126 stored in the shared memory 124 associated with the first data center 120 mirrors or at least closely mirrors the processing data 126 stored in the shared memory 134 associated with the second data center 130.

Server 132a of the second data center 130 may be configured to resume the processing of the processing job 125 in the event the processing is interrupted because of the first data center 120 failing and going out of service. In an embodiment, server 132a may be configured to detect when the processing of the processing job is interrupted because of the first data center going out of service. For example, server 132a may be configured to monitor the first data center 120 (e.g., including first server 122a) and determine when the first data center 120 goes out of service. In one example, server 132a may be configured to continually (e.g., periodically or according to a preconfigured schedule) ping one or more servers 122 associated with the first data center 120 to determine whether the first data center 120 is available and functioning normally. In this context, a "ping" may be a software utility that is used to test the reachability of a device (e.g., server) in a network (e.g., network 160). Server 132a may be configured to determine that the first data center 120 or a portion thereof is unavailable and/or out of service in response to not receiving a response to one or more pings from one or more servers 122 associated with the first data center 120.

Upon determining that the first data center 120 was rendered out of service while processing the processing job 125, server 132a may be configured to automatically take over processing of the processing job 125 from the first server 122a associated with the first data center 120. For example, in response to determining that the first data center 120 is out of service, server 132a may access the processing data 126 stored in the shared memory 134 and resume processing of the processing job 125 based on the processing data 126. In one embodiment, based on examining the processing data 126 (e.g., processing log), server 132a may determine a last stage associated with processing of the processing job 125 that was successfully completed by the first server 122a. In this case, server 132a may resume processing of the processing job 125 by initiating processing a stage next to the last stage that was processed successfully by the first server 122a. In an alternative or additional embodiment, based on examining the processing data 126 (e.g., processing log) server 132a may determine a stage associated with processing of the processing job 125 that was being processed when the first data center 120 went out of service. In this case, server 132a may resume processing of the processing job 125 by initiating processing of the same stage of processing the processing job 125 that was interrupted when the first data center 120 went out of service. It may be noted that server 132a is able to resuming processing of the processing job 125 at or near a stage where the processing was interrupted at the first server 122a, because the processing data 126 associated with the processing at the first server 122a is transmitted and stored in the shared memory 134 in real-time. This means that shared memory 134 reflects the most recent processing data 126 which allows the server 132a at the second data center 130 to resume processing the processing job 125 without interruption in service. This avoids and, in some cases, eliminates any downtime associated with the first data center 120 going out of service.

In one or more embodiments, computing infrastructure 110 may implement multiple backup failover systems/mechanisms in case multiple data centers go out of service. For example, a statewide or countrywide power outage may cause multiple data centers to go out of service. In one embodiment, multiple secondary data centers may be configured to take over processing of a processing job 125 in the event the first data center 120 is rendered out of services. For example, in addition to the second data center 130, the third data center 140 may also be configured to take over/resume processing of the processing job 125 from the first data center 120. In this context, in addition to transmitting the processing data 126 to the second data center 130, first server 122a may be configured to transmit the processing data 126 to the third data center 140 in real-time, for example, as the processing data 126 is being generated and stored in the shared memory 124 of the first data center 120. For example, as the processing job 125 is processed by the first server 122a and as the processing data 126 is generated, first server 122a may be configured to store the processing data into the shared memory 124 and simultaneously transmit the processing data 126 to the second data center 130 and the third data center 140. A server 142a in the third data center 140 may be configured to receive the processing data 126 from the first server 122a and store in the shared memory 144 associated with the third data center 140 such that, at any time, shared memory 144 mirrors or closely mirrors the shared memory 124 associated with the first data center 120 and the shared memory 134 associated with the second data center 130 with regard to the processing data 126. In other words, at any time during the processing of the processing job 125 processing data 126 stored in the shared memory 124 associated with the first data center 120 mirrors or at least closely mirrors the processing data 126 stored in the shared memory 134 associated with the second data center 130 and the processing data 126 stored in the shared memory 144 associated with the third data center 140. This allows processing of the processing job 125 to be resumed at either one of the second data center 130 or the third data center 140.

In an alternative or additional embodiment, server 132a may be configured to forward processing data 126 received from the first server 122a in real-time to the third data center 140. Server 142a may be configured to receive the processing data 126 from the server 132a and store the received processing data 126 in the shared memory 144 of the third data center 140.

Server 142a of the third data center 140 may be configured to resume the processing of the processing job 125 in the event the processing at the first data center 120 is interrupted because of the first data center 120 failing and going out of service and the second data center is also unavailable to take over processing from the first data center 120. In an embodiment, server 142a may be configured to detect when the first data center 120 is rendered out of service while processing the processing job 125. In addition, server 142a may also be configured to detect when the second data center 130 is rendered out of service and is thus unavailable to resume processing of the processing job 125. For example, server 142a may be configured to monitor the first data center 120 (e.g., including first server 122a) determine when the first data center 120 goes out of service. In one example, server 142a may be configured to ping one or more servers 122 associated with the first data center 120 to determine whether the first data center 120 is available and functioning normally. Server 142a may be configured to determine that the first data center 120 or a portion thereof is unavailable and/or out of service in response to not receiving a response to one or more pings from one or more servers 122 associated with the first data center 120. Additionally, server 142a may be configured to determine when the second data center 130 is out of service and unavailable to process the processing job 125. In one embodiment, server 142a is configured to start pinging the second data center 130 only upon determining that the first data center 120 was rendered out of service while processing the processing job 125. In other words, server 142a determines whether the second data center 130 is offline only upon determining that the first data center 120 is offline. Alternatively, server 142a continually (e.g., periodically or according to a predetermined schedule) pings both the first data center 120 and the second data center 130 to determine their availability.

Upon determining that the first data center 120 was rendered out of service while processing the processing job 125 and that the second data center 130 is unavailable to take over the processing from the first data center 120, server 142a may be configured to automatically take over processing of the processing job 125 from the first server 122a associated with the first data center 120. For example, in response to determining that the first data center 120 is out of service and that the second data center 130 is unavailable to take over the processing from the first data center 120, server 142a may access the processing data 126 stored in the shared memory 144 and resume processing of the processing job 125 based on the processing data 126. In one embodiment, based on examining the processing data 126 (e.g., processing log), server 142a may determine a last stage associated with processing of the processing job 125 that was successfully completed by the first server 122a. In this case, server 142a may resume processing of the processing job 125 by initiating processing a stage next to the last stage that was processed successfully by the first server 122a. In an alternative or additional embodiment, based on examining the processing data 126 (e.g., processing log) server 142a may determine a stage associated with processing of the processing job 125 that was being processed when the first data center 120 went out of service. In this case, server 142a may resume processing of the processing job 125 by initiating processing of the same stage of processing the processing job 125 that was interrupted when the first data center 120 went out of service. It may be noted that server 142a is able to resuming processing of the processing job 125 at or near a stage where the processing was interrupted at the first server 122a, because the processing data 126 associated with the processing at the first server 122a is transmitted and stored in the shared memory 144 in real-time. This means that shared memory 144 reflects the most recent processing data 126 which allows the server 142a at the third data center 140 to resume processing the processing job 125 without interruption in service. Thus, the third data center 140 provides an additional back up in the event that the first data center 120 as well as the second data center 130 cannot complete processing of the processing job 125.

In certain embodiments, computing infrastructure 110 may implement data replication across data servers 122 of a particular data center 120 such that a second server 122b may take over processing of a processing job 125 from a first server 122a in the event processing is interrupted at the first server 122a. For example, second server 122b may be configured to continually (e.g., periodically or according to a pre-configured schedule) monitor availability of the first server 122a, for example, by pinging the first server 122a. Upon determining that the first server 122a went offline while processing the processing job 125, second server 122b may access the processing data 126 from the shared memory 124 and resume processing of the processing job 125 as described above with reference to the server 132a.

Figure 2:
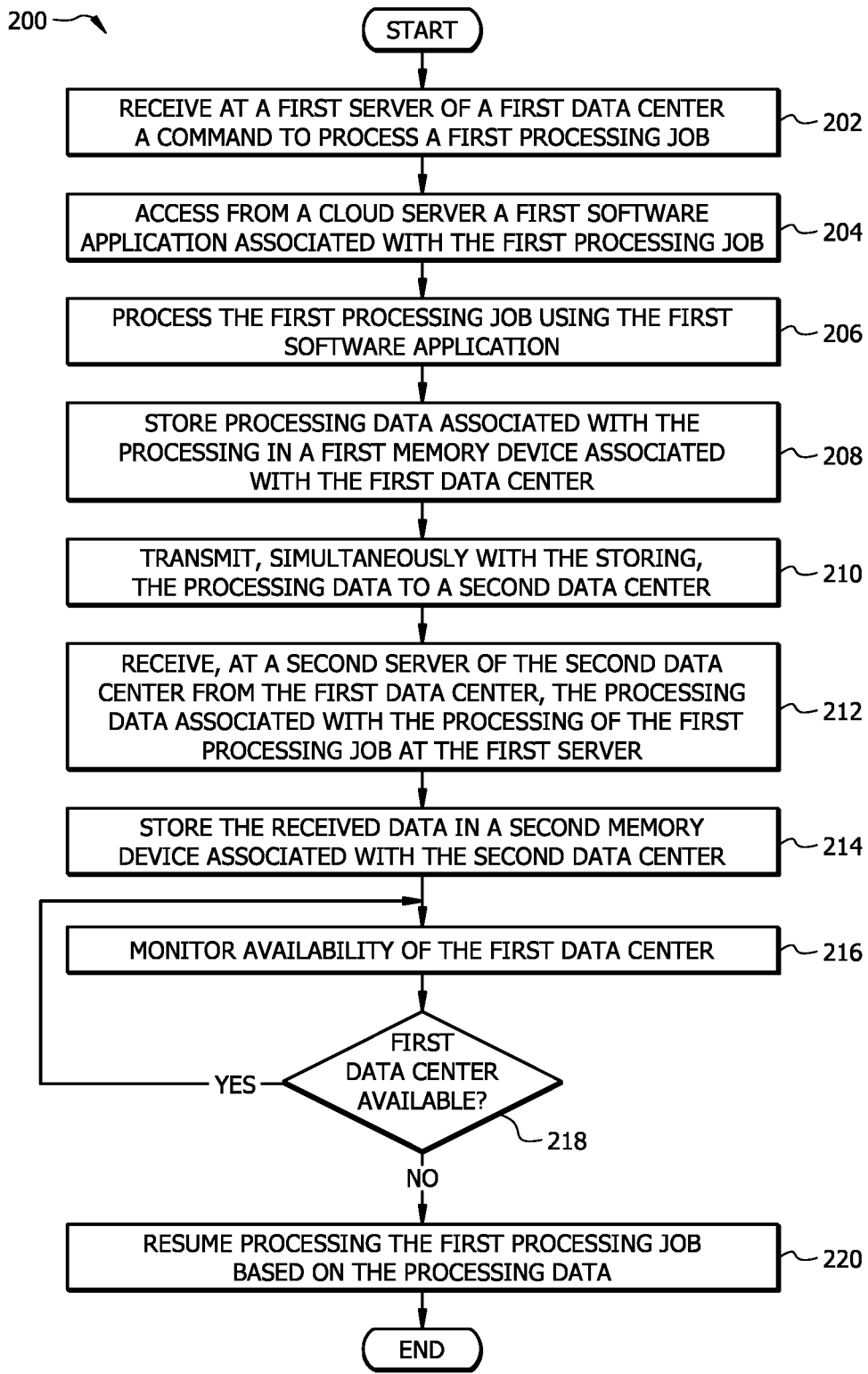
FIG. 2 illustrates a flowchart of an example method for recovering from a data center failure, in accordance with one or more embodiments of the present disclosure.

FIG. 2 illustrates a flowchart of an example method 200 for recovering from a data center failure, in accordance with one or more embodiments of the present disclosure. Method 200 may be performed by the first server 122a and the server 132a shown in FIG. 1.

At operation 202, first server 122a of the first data center 120 receives a command 123 to process a first processing job (e.g., processing job 125).

As described above, the first data center 120 may be configured to receive a command 123 to process/execute a processing job 125 using a particular software application 174 stored in the cloud service 170 (e.g., stored on a cloud server 172). The processing job 125 may include extracting source data from one or more source systems/databases (not shown), transform the source data using the software application 174 (e.g., an ETL application), and store the transformed data into one or more target systems/databases (e.g., a data warehouse). It may be noted that the source systems/databases and the target systems/databases may be part of and/or stored in one or more servers 122, 132, 142 associated with respective one or more data centers 120, 130 and 140.

At operation 204, the first server 122a accesses from a cloud server 172 a first software application (e.g., software application 174) associated with the processing job 125.

At operation 206, the first server 122a processes the processing job 125 using the software application 174.

As described above, in response to receiving the command 123, first server 122a of the first data center 120 may access the software application 174 associated with processing the processing job 125 from the cloud service 170 and may process the requested processing job 125 by running the software application 174.

At operation 208, the first server 122a stores processing data 126 associated with the processing of the processing job 125 in a first memory device (e.g., shared memory 124) associated with the first data center 120.

As described above, first server 122a may be configured to store processing data 126 associated with processing of the processing job 125 in the shared memory 124 in real-time as the processing is conducted by the first server 122a. Processing data 126 may include, but is not limited to, data indicative of a stage of the processing being conducted by the first server 122a, a stage and/or stages of processing that have been completed by the first server 122a, and any other data and/or metadata generated when processing previous stages of the processing job 125 and needed for processing subsequent stages of the processing job 125. In one example, processing data 126 associated with processing of processing job 125 includes a processing log that records data and metadata associated with the processing.

At operation 210, first server 122a transmits, simultaneously with the storing, the processing data 126 associated with the processing to the second data center 130.

As described above, a data center 120 or a portion thereof (e.g., one or more servers 122) may fail because of several reasons. Servers 122 of the first data center 120 may be configured to implement a failure recovery mechanism to handle situations where the first data center 120 or a portion thereof fails and goes out of service. First server 122a may be configured to transmit the processing data 126 to the second data center 130 in real-time, for example, as the processing data 126 is being generated and stored in the shared memory 124 of the first data center 120. For example, as the processing job 125 is processed by the first server 122a and as the processing data 126 is generated, first server 122a may be configured to store the processing data into the shared memory 124 and transmit to the second data center 130 simultaneously.

At operation 212, the server 132a of the second data center 130 receives, from the first server 122a of the first data center 120, the processing data 126 associated with processing of the processing job 125 at the first server 122a.

At operation 214, the server 132a stores the received processing data 126 in a second memory device (e.g., shared memory 134) associated with the second data center 130.

As described above, server 132a in the second data center 130 may be configured to receive the processing data 126 from the first server 122a and store in the shared memory 134 associated with the second data center 130 such that, at any time, shared memory 134 mirrors or closely mirrors the shared memory 124 associated with the first data center 120 with regard to the processing data 126. In other words, at any time during the processing of the processing job 125 processing data 126 stored in the shared memory 124 associated with the first data center 120 mirrors or at least closely mirrors the processing data 126 stored in the shared memory 134 associated with the second data center 130.

At operation 216, the server 132a monitors availability of the first data center 120 to process the processing job 125. For example, server 132a monitors whether the processing of the processing job 125 was interrupted at the first server 122a because the first data center 120 went offline.

As described above, server 132a of the second data center 130 may be configured to resume the processing of the processing job 125 in the event the processing is interrupted because of the first data center 120 failing and going out of service. In an embodiment, server 132a may be configured to detect when the processing of the processing job is interrupted because of the first data center going out of service. For example, server 132a may be configured to monitor the first data center 120 (e.g., including first server 122a) and determine when the first data center 120 goes out of service. In one example, server 132a may be configured to continually (e.g., periodically or according to a preconfigured schedule) ping one or more servers 122 associated with the first data center 120 to determine whether the first data center 120 is available and functioning normally. In this context, a "ping" may be a software utility that is used to test the reachability of a device (e.g., server) in a network (e.g., network 160). Server 132a may be configured to determine that the first data center 120 or a portion thereof is unavailable and/or out of service in response to not receiving a response to one or more pings from one or more servers 122 associated with the first data center 120.

At operation 218, based on monitoring the first data center 120, server 132a determines whether the first data center is available.

In one embodiment, upon determining that the first data center 120 is available (e.g., in response to receiving a response to a ping), server 132a examines the processing data 126 stored in the shared memory 134 to determine whether the processing of the processing job 125 was completed by the first server 122a. If the server 132 determines that the first server 122a has not completed the processing, the server 132 may continue monitoring the first data center 120 for availability at operation 216. However, if the server 132 determines that the first server 122a has completed the processing, the server 132 may stop monitoring the first data center for availability and the method 200 may end here.

In an additional or alternative embodiment, in response to determining that the first data center 120 is unavailable and out of service, server 132a examines the processing data 126 stored in the shared memory 134 to determine whether the processing of the processing job 125 was completed by the first server 122a. Method 200 proceeds to operation 220 only when server 132 determines that the first data center 120 went offline without completing the processing of the processing job 125. If the server 132 determines that the first server 122a completed the processing before going offline, the method 200 may end here.

At operation 220, server 132a resumes processing the processing job 125 based on the processing data 126 associated with the processing of the processing job 125 at the first server 122a as stored in the shared memory device 134.

As described above, upon determining that the first data center 120 was rendered out of service while processing the processing job 125, server 132a may be configured to automatically take over processing of the processing job 125 from the first server 122a associated with the first data center 120. For example, in response to determining that the first data center 120 is out of service, server 132a may access the processing data 126 stored in the shared memory 134 and resume processing of the processing job 125 based on the processing data 126. In one embodiment, based on examining the processing data 126 (e.g., processing log), server 132a may determine a last stage associated with processing of the processing job 125 that was successfully completed by the first server 122a. In this case, server 132a may resume processing of the processing job 125 by initiating processing a stage next to the last stage that was processed successfully by the first server 122a. In an alternative or additional embodiment, based on examining the processing data 126 (e.g., processing log) server 132a may determine a stage associated with processing of the processing job 125 that was being processed when the first data center 120 went out of service. In this case, server 132a may resume processing of the processing job 125 by initiating processing of the same stage of processing the processing job 125 that was interrupted when the first data center 120 went out of service.

Figure 3:
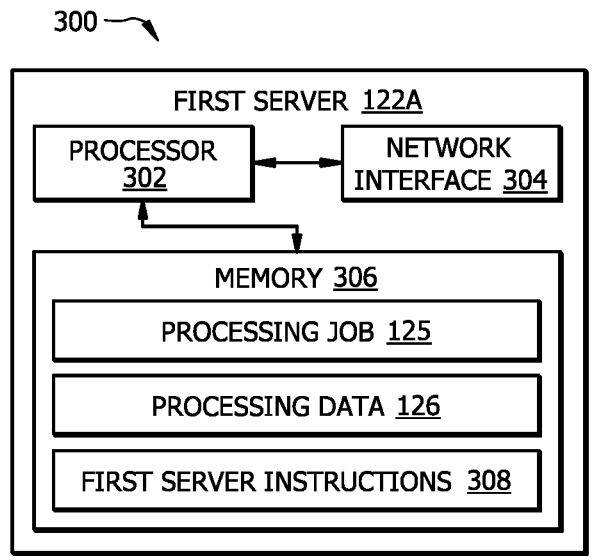
FIG. 3 illustrates an example schematic diagram of the first server shown in FIG. 1, in accordance with one or more aspects of the present disclosure.

FIG. 3 illustrates an example schematic diagram 300 of the first server 122a shown in FIG. 1, in accordance with one or more aspects of the present disclosure.

The first server 122a comprises a processor 302, a memory 306, and a network interface 304. The first server 122a may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., first server instructions 308) to implement the first server 122a. In this way, processor 302 may be a special-purpose computer designed to implement the functions disclosed herein. In one or more embodiments, the first server 122a is implemented using logic units, FPGAs, ASICs, DSPs, or any other suitable hardware. The first server 122a is configured to operate as described with reference to FIG. 2. For example, the processor 302 may be configured to perform at least a portion of the method 200 as described in FIG. 2.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM). In one embodiment, the memory 306 comprises at least a portion of the shared memory 124.

The memory 306 is operable to store processing job 125, processing data 126 (or a portion thereof), and the first server instructions 308. The first server instructions 308 may include any suitable set of instructions, logic, rules, or code operable to execute the first server 122a.

The network interface 304 is configured to enable wired and/or wireless communications. The network interface 304 is configured to communicate data between the first server 122a and other devices, systems, or domains (e.g., server 132a, server 142a, user terminal 150, cloud servers 172 etc.). For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

Figure 4:
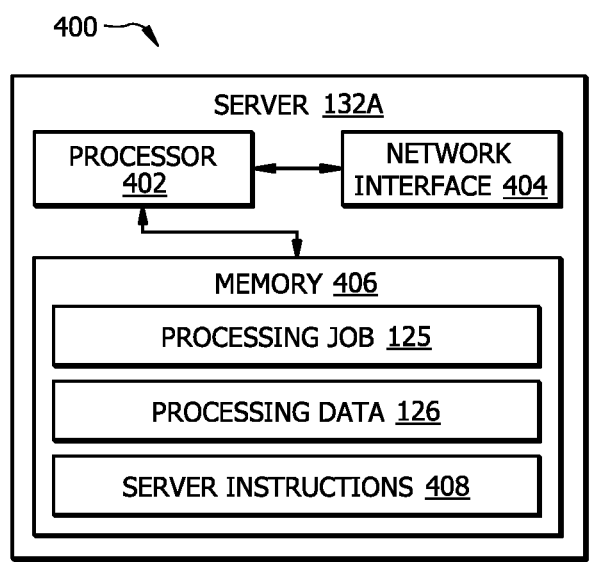
FIG. 4 illustrates an example schematic diagram of a server of the second data center shown in FIG. 1, in accordance with one or more aspects of the present disclosure.

FIG. 4 illustrates an example schematic diagram 400 of the server 132a shown in FIG. 1, in accordance with one or more aspects of the present disclosure.

The server 132a comprises a processor 402, a memory 406, and a network interface 404. The server 132a may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., server instructions 408) to implement the server 132a. In this way, processor 402 may be a special-purpose computer designed to implement the functions disclosed herein. In one or more embodiments, the server 132a is implemented using logic units, FPGAs, ASICs, DSPs, or any other suitable hardware. The server 132a is configured to operate as described with reference to FIG. 2. For example, the processor 402 may be configured to perform at least a portion of the method 200 as described in FIG. 2.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM). In one embodiment, the memory 406 comprises at least a portion of the shared memory 124.

The memory 406 is operable to store processing job 125, processing data 126 (or a portion thereof), and the server instructions 408. The server instructions 408 may include any suitable set of instructions, logic, rules, or code operable to execute the server 132a.

The network interface 404 is configured to enable wired and/or wireless communications. The network interface 404 is configured to communicate data between the server 132a and other devices, systems, or domains (e.g., first server 122a, server 142a, user terminal 150, cloud servers 172 etc.). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that each of the servers 122 (including second server 122b), servers 132, servers 142, cloud servers 172 and user terminal 150 may be implemented similar to servers 122a and server 132a shown in FIGS. 3 and 4 respectively. For example, each of the servers 122 (including second server 122b), servers 132, servers 142, cloud servers 172 and user terminal 150 may have a respective processor and a memory that stores data and instructions to perform operations discussed above.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
  a computing infrastructure comprising:
    a first data center comprising a first cluster of servers;
    a second data center comprising a second cluster of servers, wherein the first data center is communicatively coupled to the second data center;
    a third data center comprising a third cluster of servers, wherein the third data center is communicatively coupled to the first data center and the second data center; and
  a cloud server communicatively coupled to the computing infrastructure, wherein the cloud server provides one or more software applications as a service to the computing infrastructure;
  wherein a first server from the first cluster of servers associated with the first data center comprises a first processor configured to:
    receive a command to process a first processing job;
    access, from the cloud server, a first software application associated with the first processing job;
    process the first processing job using the first software application;
    store data associated with the processing of the first processing job in a first memory device associated with the first data center; and
    transmit, simultaneously with the storing, the data associated with the processing, to the second data center; and
    transmit, simultaneously with the storing in the first memory device and the transmitting to the second data center, the data associated with the processing to the third data center; and
  wherein a second server from the second cluster of servers associated with the second data center comprises a second processor configured to:
    receive, from the first data center, the data associated with the processing of the first processing job at the first server;
    store the received data in a second memory device associated with the second data center, wherein the data stored in the second memory device mirrors the data stored in the first memory device;
    monitor the first data center to detect that the processing of the first processing job was interrupted at the first server, wherein the monitoring is performed according to a preconfigured schedule;
    in response to detecting that the processing of the first processing job was interrupted, determine whether a last stage of the first processing job is completed based at least in part upon the data stored in the second memory device; and
    upon determining that the last stage of the first processing job is completed, resume processing the first processing job based on the data stored in the second memory device, wherein the first processing job is resumed at a next stage that initiates after the completed last stage;
  wherein a third server from the third cluster of servers associated with the third data center comprises a third processor configured to:
    receive, from the first data center, the data associated with the processing of the first processing job at the first server;
    store the received data in a third memory device associated with the third data center, wherein the data stored in the third memory device mirrors the data stored in the first memory device and the data stored in the second memory device;
    transmit according to a first predetermined schedule a first ping request to the first data center to monitor availability of the first data center while processing the first processing job;
    in response to transmitting the first ping request to the first data center, determine if a response to the ping request is received from the first data center;
    in response to determining that the response to the first ping request is not received from the first data center, determine at least a portion of the first data center is unavailable to process the first processing job;
    in response to determining that at least the portion of the first data center is unavailable to process the first processing job, transmit according to a second predetermined schedule a second ping request to the second data center to monitor the availability of the second data center;
    in response to transmitting the second ping request to the second data center, determine the second data center is unavailable to take over the processing of the first processing job from the first data center; and
    resume processing the first processing job based on the data associated with the processing of the first processing job at the first server as stored in the third memory device.

2. The system of claim 1, wherein:
  the third server from the third cluster of servers associated with the third data center comprises the third processor configured to:
    detect that the processing of the first processing job was interrupted at the first server; and
    resume processing the first processing job based on the data associated with the processing of the first processing job at the first server as stored in the third memory device, wherein the first processing job is resumed at the next stage that initiates after the completed last stage.

3. The system of claim 1,
  wherein the third data center is communicatively coupled to the second data center;
  the second processor is further configured to:
    forward in real-time to the third data center the data associated with the processing received from the first data center; and
  the third processor configured to:
    receive, from the second data center, the data associated with the processing of the first processing job at the first server;

store the received data in the third memory device associated with the third data center;

detect that the processing of the first processing job was interrupted at the first server and that the second data center is unavailable for processing the first processing job; and resume processing the first processing job based on the data associated with the processing of the first processing job at the first server as stored in the third memory device.

4. The system of claim 1, wherein upon determining that the last stage of the first processing job is not completed, the processing of the first processing job is resumed at the last stage of the first processing job.

5. The system of claim 1, wherein:

the first memory device is a shared memory device in the first data center and is accessible by each server in the first cluster of servers of the first data center; and processing data associated with each server in the first cluster of servers is stored in the first memory device.

6. The system of claim 1, wherein:

the first software application comprises an extract, transform and load (ETL) procedure;

the first processing job comprises extracting source data from one or more source databases, transforming the extracted source data using the ETL procedure, and loading transformed source data into one or more target databases.

7. The system of claim 1, wherein the computing infrastructure and the cloud server are separated by a firewall associated with the computing infrastructure.

8. The system of claim 1, wherein the data associated with processing the first processing job comprises an interaction log of the processing.

9. A method for processing data, comprising:

receiving, at a first server of a first data center, a command to process a first processing job;

accessing, by the first server from a cloud server, a first software application associated with the first processing job;

processing, by the first server, the first processing job using the first software application;

storing, by the first server, data associated with the processing of the first processing job in a first memory device associated with the first data center; and transmitting, by the first server, simultaneously with the storing, the data associated with the processing to a second data center;

transmitting, by the first server, the data associated with the processing to a third data center, wherein the transmitting is performed simultaneously with the storing in the first memory device and the transmitting to the second data center; and receiving, by a second server of the second data center from the first data center, the data associated with the processing of the first processing job at the first server;

storing, by the second server, the received data in a second memory device associated with the second data center, wherein the data stored in the second memory device mirrors the data stored in the first memory device;

monitoring the first data center, by the second server, to detect that the processing of the first processing job was interrupted at the first server, wherein the monitoring is performed according to a preconfigured schedule;

in response to detecting that the processing of the first processing job was interrupted, determining whether a last stage of the first processing job is completed based at least in part upon the data stored in the second memory device; and upon determining that the last stage of the first processing job is completed, resuming, by the second server, processing of the first processing job based on the data stored in the second memory device, wherein the first processing job is resumed at a next stage that initiates after the completed last stage;

receiving, by a third server of a third data center from the first data center, the data associated with the processing of the first processing job at the first server;

storing, by the third server, the received data in a third memory device associated with the third data center, wherein the data stored in the third memory device mirrors the data stored in the first memory device and the data stored in the second memory device;

transmitting, by the third server, according to a first predetermined schedule a first ping request to the first data center to monitor availability of the first data center while processing the first processing job;

in response to transmitting the first ping request to the first data center, determining, by the third server, if a response to the ping request is received from the first data center;

in response to determining that the response to the first ping request is not received from the first data center, determining, by the third server, at least a portion of the first data center is unavailable to process the first processing job;

in response to determining that at least the portion of the first data center is unavailable to process the first processing job, transmitting, by the third server, according to a second predetermined schedule a second ping request to the second data center to monitor the availability of the second data center;

in response to transmitting the second ping request to the second data center, determining, by the third server, the second data center is unavailable to take over the processing of the first processing job from the first data center; and resuming, by the third server, processing the first processing job based on the data associated with the processing of the first processing job at the first server as stored in the third memory device.

10. The method of claim 9, further comprising:

detecting, by the third server, that the processing of the first processing job was interrupted at the first server; and resuming, by the third server, processing the first processing job based on the data associated with the processing of the first processing job at the first server as stored in the third memory device, wherein the first processing job is resumed at the next stage that initiates after the completed last stage.

11. The method of claim 10, further comprising:

forwarding, by the second server in real-time to a third data center, the data associated with the processing received from the first data center; and receiving, by a third server of the third data center from the second data center, the data associated with the processing of the first processing job at the first server;

storing, by the third server, the received data in the third memory device associated with the third data center;

detecting, by the third server, that the processing of the first processing job was interrupted at the first server and that the second data center is unavailable for processing the first processing job; and resuming, by the third server, processing the first processing job based on the data associated with the processing of the first processing job at the first server as stored in the third memory device.

12. The method of claim 10, wherein upon determining that the last stage of the first processing job is not completed, the processing of the first processing job is resumed at the last stage of the first processing job.

13. The method of claim 10, wherein:
the first memory device is a shared memory device in the first data center and is accessible by each server in a first cluster of servers of the first data center; and
processing data associated with each server in the first cluster of servers is stored in the first memory device.

14. The method of claim 10, wherein:
the first software application comprises an extract, transform and load (ETL) procedure;
the first processing job comprises extracting source data from one or more source databases, transforming the extracted source data using the ETL procedure, and loading transformed source data into one or more target databases.

15. A non-transitory computer-readable medium that stores instructions which when executed by a processor causes the processor to:
receive, at a first server of a first data center, a command to process a first processing job;
access, by the first server from a cloud server, a first software application associated with the first processing job;
process, by the first server, the first processing job using the first software application;
store, by the first server, data associated with the processing of the first processing job in a first memory device associated with the first data center; and
transmit, by the first server, simultaneously with the storing, the data associated with the processing to a second data center;
transmit, by the first server, the data associated with the processing to a third data center, wherein the transmitting is performed simultaneously with the storing in the first memory device and the transmitting to the second data center; and
receive, by a second server of the second data center, from the first data center, the data associated with the processing of the first processing job at the first server;
store, by the second server, the received data in a second memory device associated with the second data center, wherein the data stored in the second memory device mirrors the data stored in the first memory device;
monitor the first data center to detect, by the second server, that the processing of the first processing job was interrupted at the first server, wherein the monitoring is performed according to a preconfigured schedule;
in response to detecting that the processing of the first processing job was interrupted, determine, by the second server, whether a last stage of the first processing job is completed based at least in part upon the data stored in the second memory device; and
upon determining that the last stage of the first processing job is completed, resume, by the second server, processing the first processing job based on the data stored in the second memory device, wherein the first processing job is resumed at a next stage that initiates after the completed last stage;
receive, by a third server of a third data center from the first data center, the data associated with the processing of the first processing job at the first server;
store, by the third server, the received data in a third memory device associated with the third data center, wherein the data stored in the third memory device mirrors the data stored in the first memory device and the data stored in the second memory device;
transmit, by the third server, according to a first predetermined schedule a first ping request to the first data center to monitor availability of the first data center while processing the first processing job;
in response to transmitting the first ping request to the first data center, determine, by the third server, if a response to the ping request is received from the first data center;
in response to determining that the response to the first ping request is not received from the first data center, determine, by the third server, at least a portion of the first data center is unavailable to process the first processing job;
in response to determining that at least the portion of the first data center is unavailable to process the first processing job, transmit, by the third server, according to a second predetermined schedule a second ping request to the second data center to monitor the availability of the second data center;
in response to transmitting the second ping request to the second data center, determine, by the third server, the second data center is unavailable to take over the processing of the first processing job from the first data center; and
resume, by the third server, processing the first processing job based on the data associated with the processing of the first processing job at the first server as stored in the third memory device.

16. The non-transitory computer-readable medium of claim 15, wherein the instructions further cause the processor to:
detect, by the third server, that the processing of the first processing job was interrupted at the first server; and
resume, by the third server, processing the first processing job based on the data associated with the processing of the first processing job at the first server as stored in the third memory device, wherein the first processing job is resumed at the next stage that initiates after the completed last stage.

17. The non-transitory computer-readable medium of claim 15, wherein the instructions further cause the processor to:
forward, by the second server in real-time to a third data center, the data associated with the processing received from the first data center; and
receive, by a third server of the third data center from the second data center, the data associated with the processing of the first processing job at the first server;
store, by the third server, the received data in the third memory device associated with the third data center;
detect, by the third server, that the processing of the first processing job was interrupted at the first server and that the second data center is unavailable for processing the first processing job; and resume, by the third server, processing the first processing job based on the data associated with the processing of the first processing job at the first server as stored in the third memory device.

18. The non-transitory computer-readable medium of claim 15, wherein upon determining that the last stage of the first processing job is not completed, the processing of the first processing job is resumed at the last stage of the first processing job.

19. The non-transitory computer-readable medium of claim 15, wherein:
   the first memory device is a shared memory device in the first data center and is accessible by each server in a first cluster of servers of the first data center; and
   processing data associated with each server in the first cluster of servers is stored in the first memory device.

20. The non-transitory computer-readable medium of claim 15, wherein:
   the first software application comprises an extract, transform and load (ETL) procedure;
   the first processing job comprises extracting source data from one or more source databases, transforming the extracted source data using the ETL procedure, and loading transformed source data into one or more target databases.

* * * * *